J. YOCOM.
CHANGE SPEED GEAR.
APPLICATION FILED OCT. 12, 1914.
1,187,220.
Patented June 13, 1916.
2 SHEETS—SHEET 2.
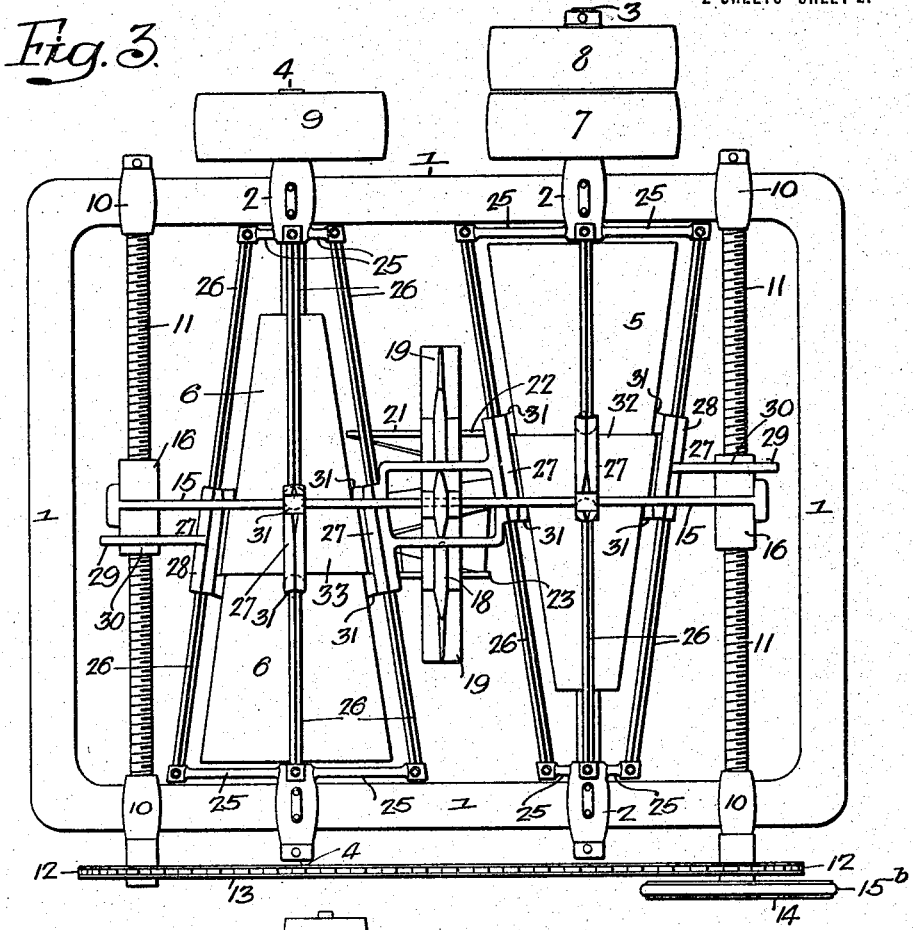
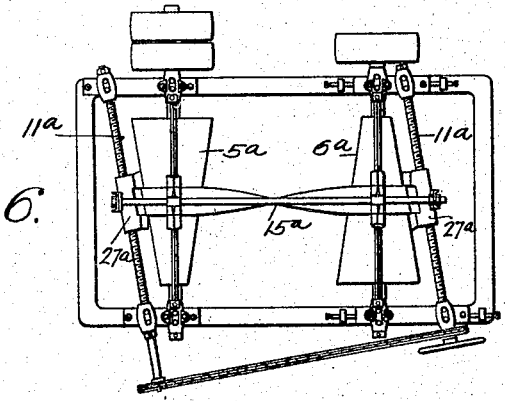
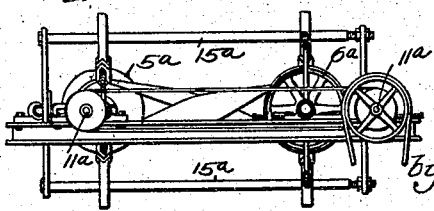

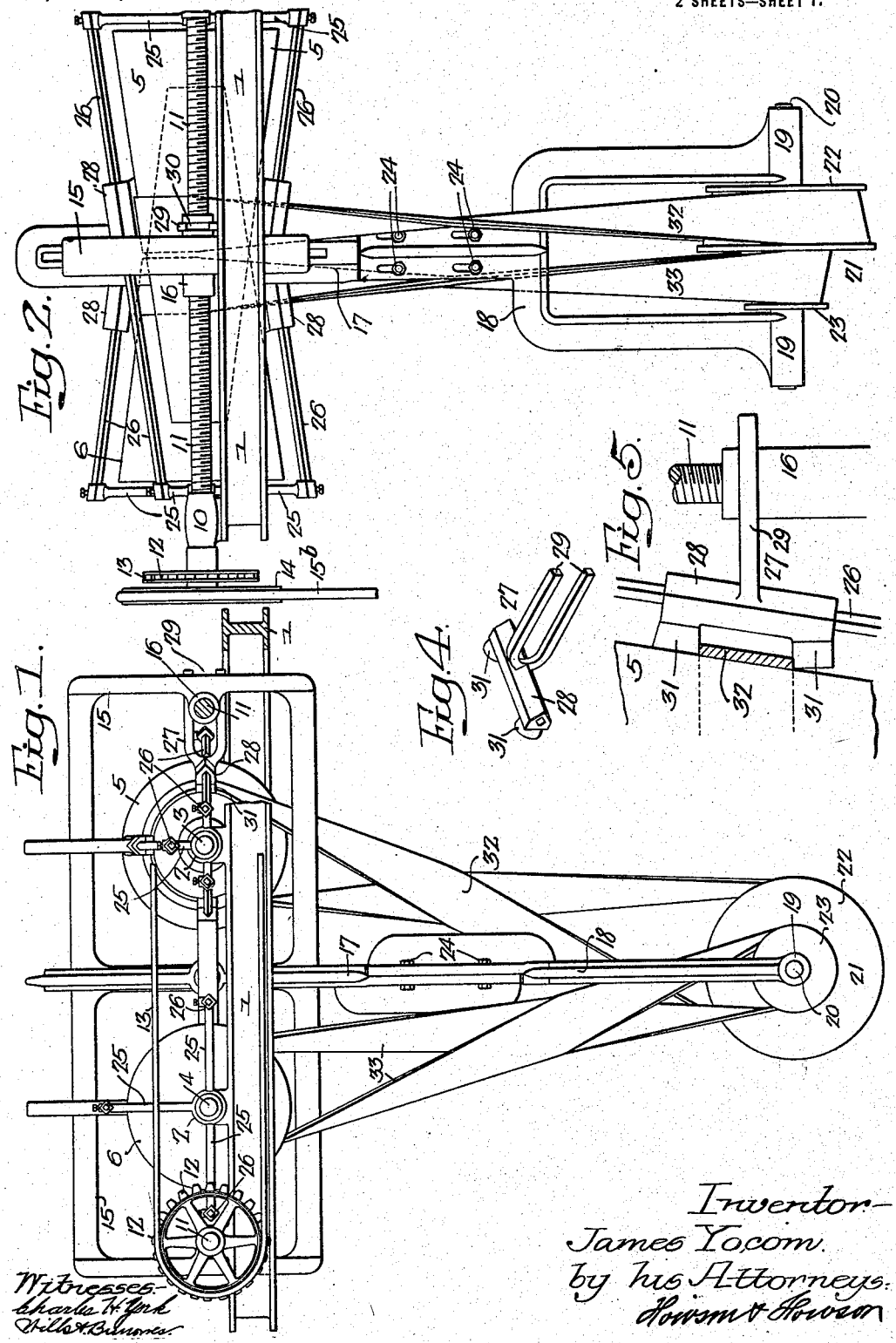

UNITED STATES PATENT OFFICE.

JAMES YOCOM, OF PHILADELPHIA, PENNSYLVANIA.

CHANGE-SPEED GEAR.

1,187,220. Specification of Letters Patent. Patented June 13, 1916.

Application filed October 12, 1914. Serial No. 866,355.

*To all whom it may concern:*

Be it known that I, JAMES YOCOM, a citizen of the United States, residing in Philadelphia, Pennsylvania, have invented certain Improvements in Change-Speed Gears, of which the following is a specification.

My invention relates to certain improvements in change speed gears of the type in which two cone pulleys are used in connection with a belt which passes around both pulleys, and in which means are arranged to shift the belt over the pulleys to increase or diminish the speed of the driven element.

One object of the invention is to construct a change speed gear of the above type so that cross belts can be used in order to keep the stretched side always toward the larger end of the cone.

A further object of the invention is to provide for directly engaging the belt at the cone so as to insure the positive and correct adjustment of the belt or belts on the cones.

A still further object of the invention is to provide guide rods for the cone shifter carriages, which are parallel to the surface of the cones.

Another object of the invention is to provide the shifters with anti-friction rollers, which bear directly on the belt at the cones.

Still another object of the invention is to make the change speed gear compact, yet providing a sufficient distance between the belts to insure the proper adhesion.

These objects and other advantageous ends I secure in the following manner, reference being had to the accompanying drawings, in which:—

Figure 1, is an end view, partly in section, of my improved change speed gear; Fig. 2, is a side view; Fig. 3, is a plan view; Fig. 4, is a detached perspective view of one of the shifters; Fig. 5, is a detached plan view, showing the belt in section and illustrating the action of the shifter; Fig. 6, is a plan view of a modification of the invention; and Fig. 7, is a side view of the construction illustrated in Fig. 6.

Referring in the first instance to Figs. 1, 2 and 3, 1 is the frame having bearings 2 for the shafts 3 and 4 on which are mounted the cone pulleys 5 and 6 respectively. In the present instance, 3 is the driving shaft on which are mounted the fast and loose pulleys 7 and 8. 4 is the driven shaft on which is mounted the single pulley 9. Mounted in bearings 10 on the frame 1 are two adjusting screws 11 having sprocket wheels 12 secured thereto, and a chain 13 passes around both sprocket wheels. 14 is a rope wheel on one of the screws and $15^b$ is a rope or chain within easy reach of an operator, so that the screws can be turned in unison to move the carriage longitudinally in respect to the cones. Mounted on screws 11, 11 is a frame 15. This frame has elongated nuts 16 through which the screws extend. Depending from the frame is an arm 17 having an adjustable extension 18 which is forked as shown in Fig. 2, and has a bearing 19 at the lower end, in which is mounted a shaft 20. On this shaft is mounted the double cone pulley 21. The section 22 of the pulley is of a greater diameter than the section 23, in the present instance, and the cone of one is reversed with respect to the other. The adjustable section 18 of the frame is slotted and bolts 24 extend through the slot and secure the two parts firmly together. Each bearing 2 is provided with three arms 25 in the present instance. The arms at the enlarged end of the cone are of a greater length than those at the small end of the cone and guide rods 26 are mounted on the arms and extend parallel with the face of each cone, as shown. These rods are square, in the present instance, but may be of any shape that will hold the shifters rigidly without departing from the essential feature of the invention.

27, 27 are shifters which are mounted on the square rods 26 and these shifters are made as illustrated in Fig. 4, having an elongated body portion 28 through which the rod 26 passes and a slotted extension 29 which engages the nut 16; the nut being grooved at 30 to receive the extension. On the portion 28 of the shifter are two anti-friction rollers 31, one being preferably conical in shape so that both shall bear upon the full edge of the belts 32 and 33 at the cones. Each belt is positively shifted when the carriage 15 is moved on turning the screws 11. The belt 32 is twisted or has a half turn and passes from the cone pulley 5 to the section 22 of the pulley 21 and the belt 33 passes from the section 23 of the pulley 21 to the cone pulley 6. This twisting of the belt brings the stretched side always toward the large end of the cone and, consequently, it fits more accurately than a straight belt would fit, if applied to the cone. By this construction, it will be seen that I am enabled to accurately shift the belts in unison on the two cones by merely turning the screws 11. While the screws are mounted parallel with the driving and driven shafts, the guides for the shifters, which are controlled by the screws, extend parallel with the face of the cones with which they adjoin.

In Figs. 6 and 7, I have illustrated a modification of the invention where the overhead room is not limited. In this instance, the two cone pulleys 5ª and 6ª are spaced apart and the screws 11ª extend parallel with the outside surface of the cones. The frame 15ª is shifted by these screws and the shifters 27ª are mounted so as to engage the belts directly at the cones. There are three shifters in this instance for each cone, as in the construction illustrated in Fig. 1, and these shifters have anti-friction rollers which bear directly against the edges of the belt for substantially the same purpose as the mechanism illustrated in Fig. 1, without using the depending frame carrying a two-faced pulley.

I claim:—

1. The combination in a change speed gear, of a driving and a driven shaft; a cone pulley on each shaft; a belt connection between the cone pulleys; two screws; a carriage actuated by the screws; fixed guides; and shifters on the carriage arranged to travel on the guides, each shifter engaging that portion of a belt which comes in contact with the pulleys.

2. The combination in a change speed gear, of two cone pulleys; a twisted belt connection between the cone pulleys; longitudinal guides extending parallel with the faces of the cone pulleys; a carriage; shifters controlled by the carriage and mounted on the guides; screws arranged to turn in unison to shift the carriage; and rollers on the shifters arranged to bear against the edges of that portion of the belt which comes in contact with the cone pulley.

3. The combination of a frame; bearings on the frame spaced apart; two shafts mounted in the bearings, one being the driven shaft and the other the driving shaft; a cone pulley mounted on each shaft; a belt connection between said cone pulleys; a series of guides arranged parallel with the cone pulleys and secured to the frame; belt shifters mounted on the guides; a carriage for the belt shifters; screws for moving the carriage lengthwise of the mechanism; and friction rollers on the shifters arranged to bear against the edges of that portion of the belt which comes in contact with its pulley, one of the rollers being conical.

4. The combination in a belt shifter, of a frame; bearings on the frame; a driving and a driven shaft mounted in the bearings; a cone pulley on each shaft; guides extending parallel with the surfaces of the cone pulleys and mounted on the frame; a shifter mounted on each guide; a carriage engaging the shifters; means for moving the carriage longitudinally with respect to the cones, said carriage having a depending frame; a pulley mounted on the lower portion of the depending frame and having two conical surfaces; and two belts, one passing from one cone pulley to one face of the pulley and the other passing from the other cone pulley to the other face of the pulley.

5. The combination in a change speed gear, of a driving and a driven shaft; a cone pulley on each shaft; belt connection between said cone pulleys; two longitudinally arranged shifting screws; means for turning the screws in unison; a carriage mounted on the screws; fixed guides extending parallel with the faces of the cone pulleys; and shifters mounted on the guides, said shifters having slotted extensions engaging the carriage and having portions engaging the belt at each cone pulley where the belt comes in contact with the pulley.

6. The combination in a change speed gear, of a driving and a driven shaft; a cone pulley on each shaft; a carriage arranged to travel longitudinally in respect to the pulleys and having a depending arm; a pulley having two narrow faces and mounted on the lower portion of the arm, the two faces being in the form of cones arranged in opposite directions; a belt passing from one cone pulley to one face of the double faced pulley and a twisted belt passing from the other face of the double faced pulley to the other cone pulley; means for moving the carriage longitudinally; and shifters mounted on the carriage and arranged to engage the belts to shift them on the cone pulleys.

7. The combination in a belt shifter, of a shaft; a cone pulley thereon; a belt arranged to pass around said pulley; three square guides extending parallel with the face of the cone pulley; a shifter mounted on each guide and having projecting portions engaging that portion of the belt which bears directly upon the cone pulley; a carriage; and means for moving the carriage, the shifters being arranged to move longitudinally with the carriage and to slide transversely thereon.

8. The combination in a change speed gear, of a driving and a driven shaft arranged side by side; a frame having bearings in which the shafts are mounted; a cone pulley on each shaft, the large end of one cone pulley being opposite the small end of the other cone pulley; two screws extending parallel with the said shafts; bearings for the screws mounted on the frame; a sprocket wheel on each screw; a chain passing around the sprocket wheels; means for turning one of said screws, motion being transmitted to the other screw; a carriage mounted on the screws; three fixed guide rods at each cone pulley and extending parallel with the face thereof; a shifter mounted on each guide rod and slidably connected to the carriage; rollers on each shifter; and a belt connection between said cone pulleys, the rollers of the shifters bearing against the edges of that portion of each belt which comes in contact with the cone pulley.

9. The combination in a change speed gear, of a driving and a driven shaft arranged side by side; a frame having bearings in which the shafts are mounted; a cone pulley on each shaft, the large end of one cone pulley being opposite the small end of the other cone pulley; two screws extending parallel with the said shafts; bearings for the screws mounted on the frame; a sprocket wheel on each screw; a chain passing around the sprocket wheels; means for turning one of said screws, motion being transmitted to the other screw; a carriage mounted on the screws; three fixed guide rods extending parallel with the face of each cone pulley; a shifter mounted on each guide rod; belts passing around the cone pulleys; rollers on each shifter bearing against the edges of that portion of each belt which comes in direct contact with the cone pulleys, said shifters having extensions slidably mounted in the carriage; an arm depending from the carriage and arranged to travel therewith; an adjustable extension mounted on the arm; a shaft carried by the extension; and a narrow, double cone pulley mounted on the said latter shaft, the belts passing around the cone pulleys also passing around the double-faced cone pulley.

In testimony whereof, I have signed my name to this specification, in the presence of two subscribing witnesses.

JAMES YOCOM.

Witnesses:
Jos. H. KLEIN,
WM. A. BARR.

Copies of this patent may be obtained for five cents each, by addressing the "Commissioner of Patents, Washington, D. C."